(12) United States Patent
Gupta et al.

(10) Patent No.: US 9,288,313 B2
(45) Date of Patent: *Mar. 15, 2016

(54) SYSTEM AND METHOD OF SIGNALING THE IMPORTANCE OF A TRANSMISSION IN A WIRELESS COMMUNICATIONS NETWORK

(71) Applicant: DELL PRODUCTS L.P., Round Rock, TX (US)

(72) Inventors: Rahul Gupta, Uttar Pradesh (IN); Sandeep Agarwal, Rajasthan (IN); Vishnu Murty Karrotu, Andhra Pradesh (IN); Deepu Syam Sreedhar.M, Kerala (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,190

(22) Filed: Dec. 11, 2014

(65) Prior Publication Data

US 2015/0094048 A1   Apr. 2, 2015

Related U.S. Application Data

(63) Continuation of application No. 13/779,977, filed on Feb. 28, 2013, now Pat. No. 8,954,037.

(51) Int. Cl.
| | |
|---|---|
| *H04M 3/22* | (2006.01) |
| *H04M 3/42* | (2006.01) |
| *H04W 4/12* | (2009.01) |
| *H04Q 3/00* | (2006.01) |
| *H04L 29/06* | (2006.01) |
| *H04W 4/16* | (2009.01) |

(52) U.S. Cl.
CPC .......... *H04M 3/42042* (2013.01); *H04L 69/22* (2013.01); *H04Q 3/0025* (2013.01); *H04W 4/12* (2013.01); *H04W 4/16* (2013.01); *H04Q 2213/13216* (2013.01)

(58) Field of Classification Search
CPC ..... H04M 3/42042; H04W 4/16; H04W 4/12; H04Q 3/0025; H04Q 2213/13216; H04L 69/22
USPC ........... 455/412.1–414.4, 458, 466, 415, 567, 455/521, 512, 404.1, 404.2
See application file for complete search history.

(56) References Cited

U.S. PATENT DOCUMENTS

| | | |
|---|---|---|
| 6,175,743 B1 | 1/2001 | Alperovich et al. |
| 6,374,102 B1 | 4/2002 | Brachman et al. |
| 6,385,461 B1 | 5/2002 | Raith |
| 6,574,480 B1 | 6/2003 | Foladare et al. |
| 6,606,491 B1 | 8/2003 | Peck |
| 6,614,781 B1 | 9/2003 | Elliott et al. |
| 6,618,600 B1 | 9/2003 | Chow et al. |

(Continued)

*Primary Examiner* — Sharad Rampuria
(74) *Attorney, Agent, or Firm* — Baker Botts L.L.P.

(57) ABSTRACT

A method of communicating an importance level of a call to a recipient mobile device is disclosed. The method includes receiving call information for a particular call at a mobile switching center and generating an initial address message for the particular call. The initial address message may include a notification value field. The method further includes determining whether an importance level has been designated for the particular call, setting a value of the notification value field based on whether an importance level has been designated for the particular call, and transmitting the initial address message for the particular call to a recipient mobile device.

17 Claims, 6 Drawing Sheets

(56) References Cited

U.S. PATENT DOCUMENTS

| | | |
|---|---|---|
| 6,766,162 B1 | 7/2004 | Beamish |
| 6,807,170 B1 | 10/2004 | Dendi et al. |
| 6,937,880 B2 | 8/2005 | Teranishi |
| 7,142,534 B1 | 11/2006 | Whent et al. |
| 8,116,740 B2 | 2/2012 | van der Haar et al. |
| 8,289,158 B2 | 10/2012 | Bocking et al. |
| 8,532,607 B2 | 9/2013 | Sennett et al. |
| 8,532,627 B1 | 9/2013 | Nassimi |
| 8,538,468 B2 | 9/2013 | Daly |
| 8,700,081 B2 | 4/2014 | Lindner |
| 2004/0116119 A1* | 6/2004 | Lewis .................. G06Q 20/102 455/435.1 |
| 2007/0004421 A1 | 1/2007 | Chambers et al. |
| 2007/0183364 A1 | 8/2007 | Donovan et al. |
| 2009/0286514 A1* | 11/2009 | Lichorowic ............. G10L 13/00 455/412.2 |
| 2010/0130159 A1 | 5/2010 | Wu et al. |
| 2011/0298614 A1* | 12/2011 | Bells ................... G06Q 10/109 340/539.13 |

* cited by examiner

SYSTEM AND METHOD OF SIGNALING THE IMPORTANCE OF A TRANSMISSION IN A WIRELESS COMMUNICATIONS NETWORK

CROSS-REFERENCES TO RELATED APPLICATIONS

The present application is a continuation of U.S. patent application Ser. No. 13/779,977 filed Feb. 28, 2013, which is hereby incorporated by reference in its entirety for all purposes.

TECHNICAL FIELD

This disclosure relates generally to communications networks and, more particularly, to wireless communications networks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. For example, an information handling system may be a tablet computer or mobile device (e.g., personal digital assistant (PDA) or smart phone) configured to transmit data on a wireless communications network. Information handling systems may include a variety of hardware and software components that may be configured to process, store, and communicate information and may include one or more computer systems, data storage systems, and networking systems.

As discussed above, an information handling system may be a mobile device, such as a mobile phone configured to transmit data on a wireless communications network. When a user places a call on a mobile device, an Initial Address Message (IAM) may be generated by a mobile switching center associated with the mobile device placing the call and transmitted from the mobile switching center through each base station and/or switch needed to complete the path between the mobile device placing the call and the mobile device receiving the call. An IAM may include, among other information, the phone number of the mobile device from which the call originated, which may be displayed by the recipient mobile device when the call is received. This information may enable the user of the recipient mobile device to identify the caller before answering a call and thus determine whether to answer the call based on the identity of the caller.

SUMMARY

A method of communicating an importance level of a call to a recipient mobile device is disclosed. The method includes receiving call information for a particular call at a mobile switching center and generating an initial address message for the particular call. The initial address message may include a notification value field. The method further includes determining whether an importance level has been designated for the particular call, setting a value of the notification value field based on whether an importance level has been designated for the particular call, and transmitting the initial address message for the particular call to a recipient mobile device.

A system for transmitting signals in a wireless communications network is disclosed. The system includes a destination mobile switching center configured to communicate with a recipient mobile device and an originating mobile switching center configured to receive call information for a particular call from an originating mobile device and generate an initial address message for the particular call, the initial address message including a notification value field. The originating mobile switching center is further configured to determine whether an importance level has been designated for the particular call, set a value of the notification value field based on whether an importance level has been designated for the particular call, and transmit the initial address message for the particular call to a recipient mobile device via the destination mobile switching center.

A mobile switching center of a wireless communications network is disclosed. The mobile switching center includes a processor and a non-transitory, computer-readable medium storing computer-program instructions. The computer program instructions, when executed, cause the processor to receive call information for a particular call at a mobile switching center and generate an initial address message for the particular call, the initial address message including a notification value field. The computer-program instructions, when executed, further cause the processor to determine whether an importance level has been designated for the particular call, set a value of the notification value field based on whether an importance level has been designated for the particular call, and transmit the initial address message for the particular call to a recipient mobile device.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

It is not uncommon for mobile device users to screen calls, avoiding those calls the user does not wish to take at the time they are received. Such screening may, however, cause the user to unintentionally avoid an important phone call. In accordance with the teachings of the present disclosure, a user placing a call may designate an importance level corresponding to that call. The importance level of the call may be displayed on the mobile device of the recipient, thereby permitting the recipient to determine whether to answer the call in light of its importance level designation.

Figure 1:
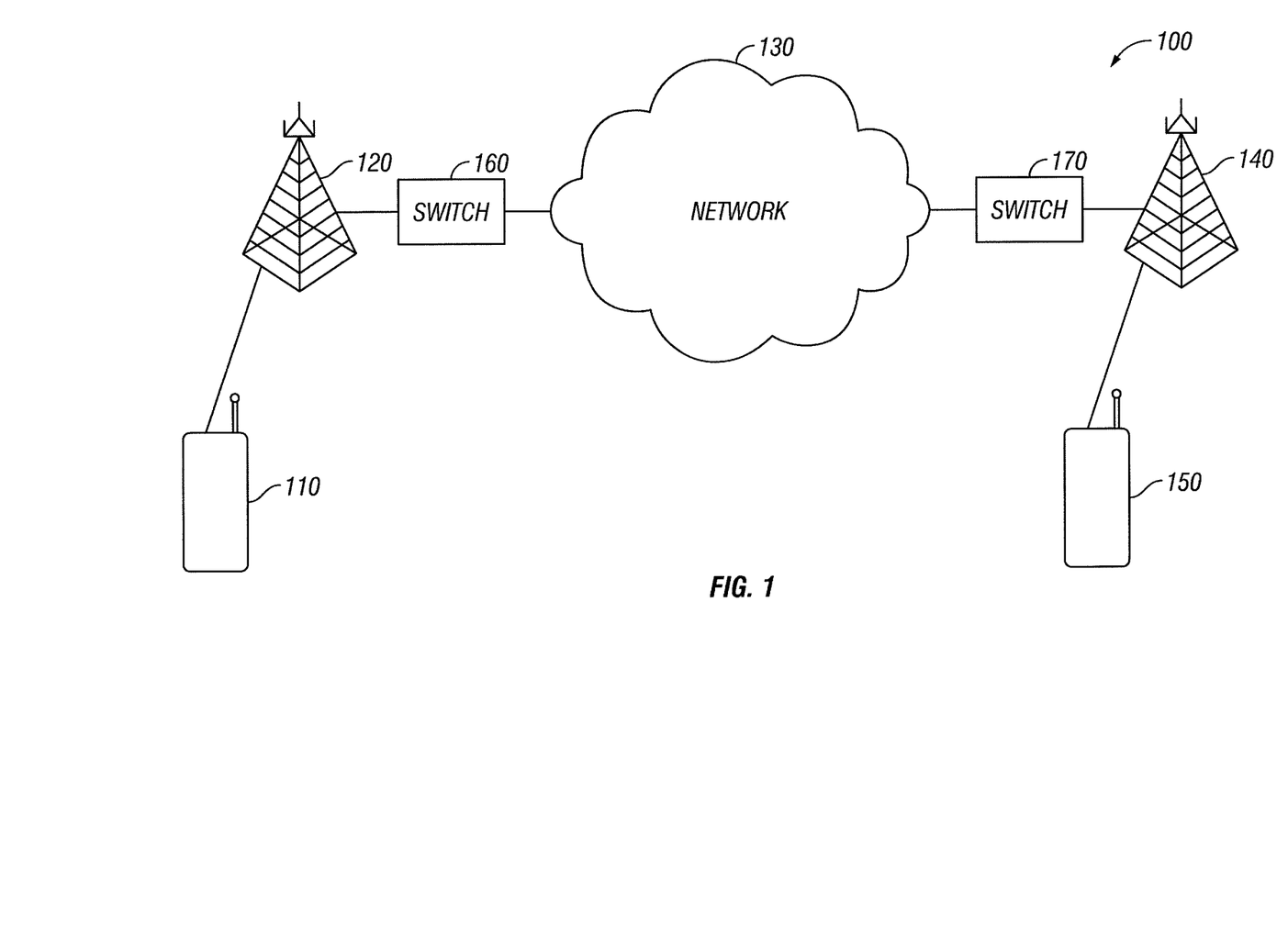
FIG. 1 illustrates an example wireless communications network.

FIG. 1 illustrates a wireless communications system 100, in accordance with one embodiment of the present disclosure. Wireless communications system 100 may include mobile devices 110 and 150, base stations 120 and 140, mobile switching centers 160 and 170, and wireless communications network 130. Mobile devices 110 and 150 may be portable computer or computing devices including functionality for communicating over a network. For example, mobile devices 110 and 150 may be mobile phones, tablet computers, laptop computers, handheld game consoles, electronic book readers, or any other suitable portable devices. Mobile devices 110 and 150 may also be referred to as user equipment (UE). Mobile devices 110 and 150 may connect to wireless communications network 130 via base stations 120 and 140 and mobile switching centers 160 and 170. Although FIG. 1 depicts two mobile devices 110 and 150, wireless communications system 100 may include any suitable number of mobile devices.

Base stations 120 and 140 may be referred to as Node B for 3rd generation (3G) cellular networks (e.g., Universal Mobile Telecommunications Systems or UMTS networks) or evolved Node B (eNB) for LTE networks. Base stations 120 and 140 may include any combination of hardware, software embedded in a computer readable medium, and/or encoded logic incorporated in hardware or otherwise stored (e.g., firmware) to implement any number of communication protocols that allow for wired or wireless exchange of packets in wireless communication system 100. Base stations 120 and 140 may communicate with mobile devices 110 and 150 using a variety of different wireless technologies, including, but not limited to, orthogonal frequency division multiple access (OFDMA) and the LTE-A protocol as defined in the 3rd Generation Partnership Project (3GPP). Although FIG. 1 depicts two base stations 120 and 140, wireless communications system 100 may include any suitable number of base stations.

Mobile switching centers 160 and 170 may include any combination of hardware, software embedded in a computer readable medium, and/or encoded logic incorporated in hardware or otherwise stored (e.g., firmware) to implement any number of communication protocols that allow for wired or wireless exchange of packets in wireless communication system 100. Mobile switching centers 160 and 170 may be configured to route transmissions to a mobile switching center and/or base station associated with the recipient mobile device. Consider, for example, a transmission from mobile device 110 to mobile device 150. The transmission from mobile device 110 may be received by mobile switching center 160 via base station 120. Mobile switching center 160 may route the transmission to mobile switching center 170 via wireless communications network 130. Mobile device 150 may receive the transmission from mobile switching center 170 via base station 140.

Wireless communications network 130 may be a Code Division Multiple Access (CDMA) network, a Global System for Mobile Communications (GSM) network, a Long-Term Evolution (LTE) network, an LTE-A network, or any other suitable wireless network or combination of networks. A phone call placed from mobile device 110 may be routed through wireless network 130 before reaching the mobile device of the intended recipient. For example, a call placed from mobile device 110 to mobile device 150 may be routed through base station 120, mobile switching center 160, wireless communications network 130, mobile switching center 170, and base station 140 before reaching mobile device 150.

When a user places a call on a mobile device (e.g., the originating mobile device), the mobile switching center corresponding to the originating mobile device may generate an Initial Address Message (IAM), which may be transmitted from the mobile switching center through each base station and/or switch needed to complete the path between the originating mobile device and the mobile device receiving the call (e.g., the recipient mobile device).

Figure 2:
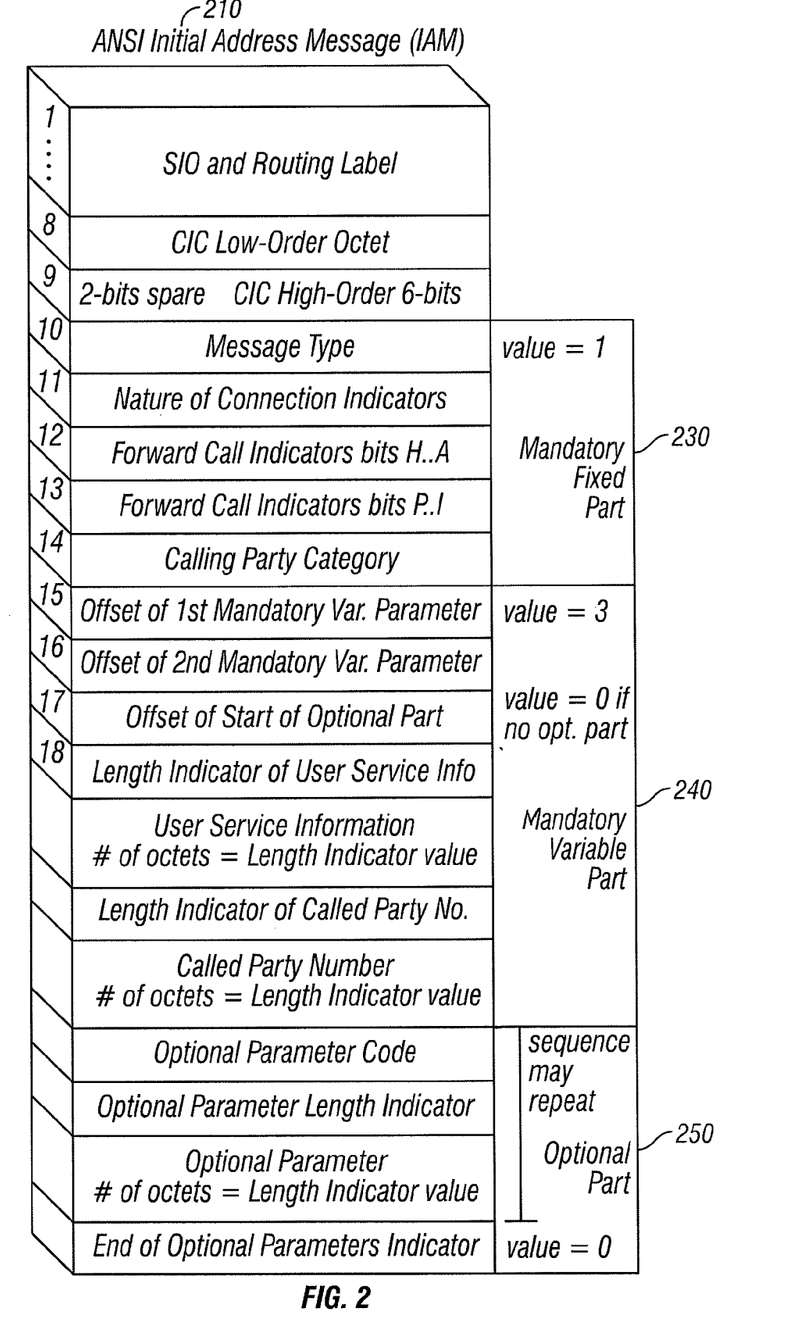
FIG. 2 illustrates two example Initial Address Messages (IAMs), one in the format prescribed by the American National Standards Institute (ANSI) and one in the format prescribed by the International Telecommunications Union (ITU)

An IAM may be transmitted in one of two formats, the format prescribed by the American National Standards Institute (ANSI) or the format prescribed by the International Telecommunications Union (ITU). FIG. 2 illustrates two example IAMs 210 and 220. IAM 210 is in ANSI format and IAM 220 is in ITU format. Both IAM 210 and IAM 220 include a mandatory fixed part 230 and 260, a mandatory variable part 240 and 270, and an optional part 250 and 280. The mandatory variable part 240 and 270 may include, among other information, the phone number of the recipient mobile device. The optional part 250 and 280 may include, among other information, the phone number of the originating mobile device and/or the name of the user of the originating mobile device, both or one of which may be displayed by the recipient mobile device when the call is received. Consider, for example, a call placed by mobile device 110 to mobile device 150. The IAM associated with the call may include the phone number of mobile device 110, which may be displayed by mobile device 150 when the call is received. This information may enable the user of the recipient mobile device to identify the caller before answering a call and thus determine whether to answer a call based on the identity of the caller. The current ANSI and ITU format IAMs do not, however, provide any way for the user of the recipient mobile device to determine the importance level of a particular phone call.

Figure 3:
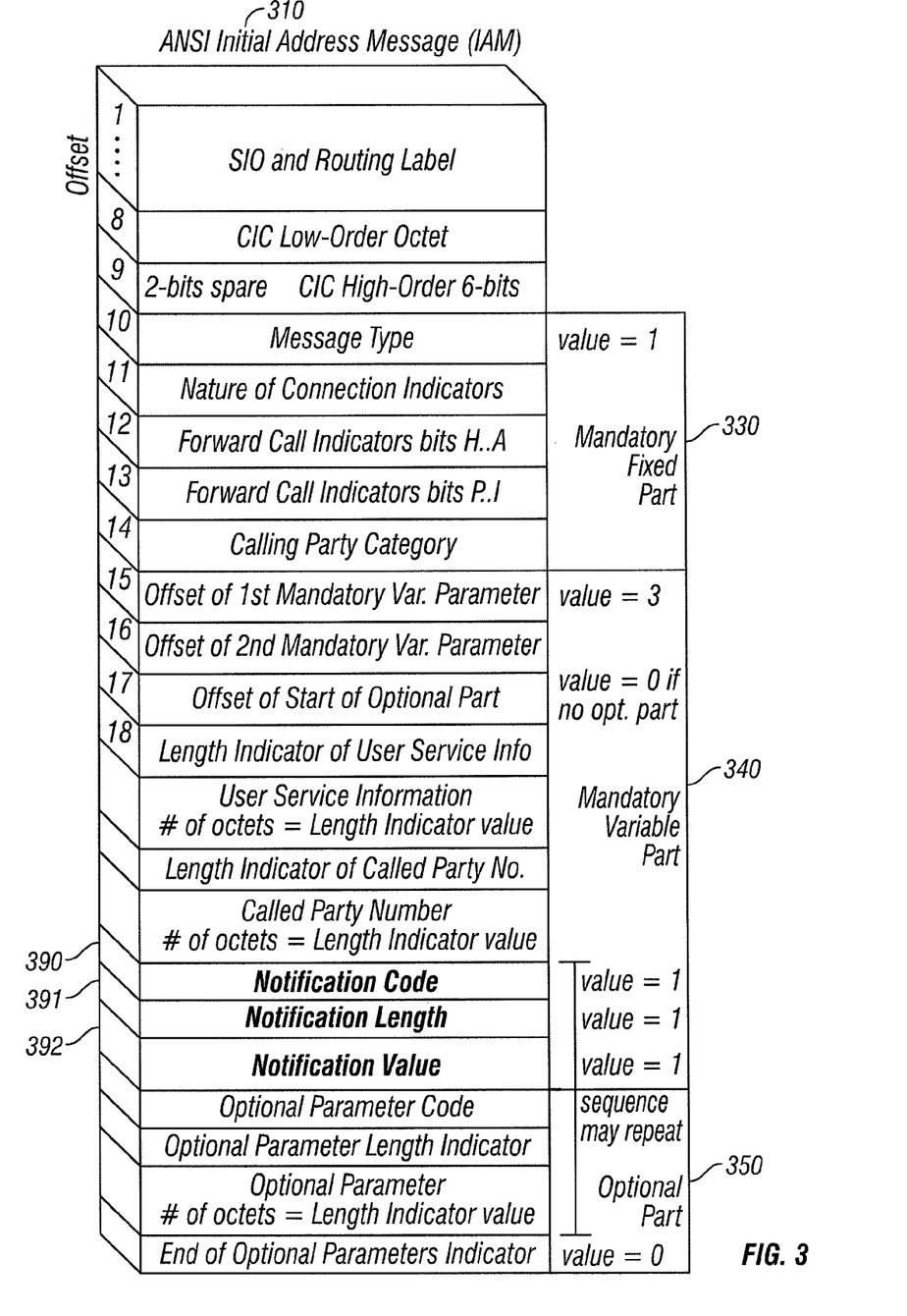
FIG. 3 illustrates two example IAMs, one in ANSI format and the other in ITU format, including a Notification Value Field, in accordance with the teachings of the present disclosure.

In accordance with the teachings of the present disclosure, parameters related to the importance level of a call may be appended to the mandatory variable part of an IAM. FIG. 3 illustrates two example IAMs 310 and 320, which may include importance-level parameters. IAM 310 is in ANSI format and IAM 320 is in ITU format. Like IAM 210 and IAM 220, both IAM 310 and IAM 320 include a mandatory fixed part 330 and 360, a mandatory variable part 340 and 370, and an optional part 350 and 380. Unlike IAMs 210 and 220, however, both IAM 310 and IAM 320 include importance-level parameters 390-392 and 395-397, respectively, which may be appended to mandatory variable parts 340 and 370, respectively.

A user placing a call on a mobile device may designate the importance level of a call by entering a particular sequence using the keypad of the mobile device. In some embodiments, a user placing a call may designate the call as important by entering #1 following entry of the phone number of the mobile device to which the call is directed. If a call has been designated as important, the notification value field 392 and/or 397 of IAMs 310 and/or 320, respectively, may be set to "1." If a call has not been designated as important, the notification value field 392 and/or 397 of IAMs 310 and/or 320, respectively, may be set to "0."

In another embodiment, a call may be designated with varying levels of importance. For example, a user may designate the importance level of a call on a scale of 1-3, by entering #1, #2, or #3 following entry of the phone number of the recipient mobile device. An importance level of "1" may, for example, correspond to the highest importance level, while an importance level of "3" may, for example, correspond to the lowest importance level. The notification value field 392 and/or 397 of IAMs 310 and/or 320, respectively, may be set to a value corresponding to the importance level designated by the user. For example, if the user enters #2 following entry of the phone number of the recipient mobile device, thereby designating the call as having an importance level of "2," the notification value field 392 and/or 397 of IAMs 310 and/or 320, respectively, may be set to "2."

When the IAM is received by the recipient mobile device, a notification corresponding to the value of the notification value field may be displayed on the screen of the recipient mobile device. The notification may be merely a display of the notification value or it may be a message corresponding to the importance level designated by the user. For example, in some embodiments, an importance level of "1" may correspond to a notification of "Urgent," an importance level of "2" may correspond to a notification of "Moderately Important," and an importance level of "3" may correspond to a notification of "Routine." Consider, for example, a call placed by the user of mobile device 110 to mobile device 150. The user of mobile device 110 may designate the importance level of the call by entering #1 following entry of the phone number corresponding to mobile device 150. The notification value field 392 and/or 397 of IAMs 310 and/or 320, respectively, may be set to a value of "1" and a notification of "Urgent" may be displayed on the screen of mobile device 150 when the call is received.

Figure 4:
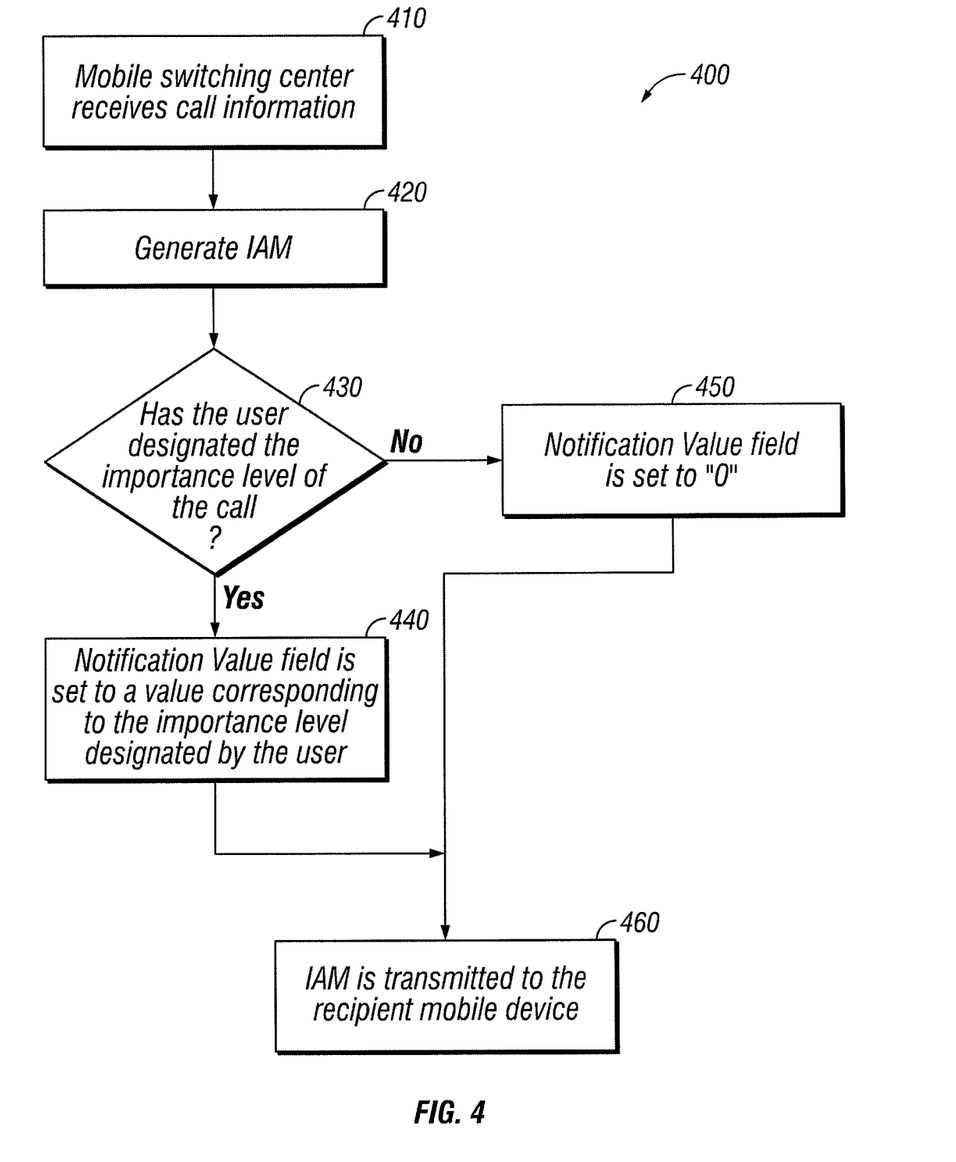
FIG. 4 illustrates an example of communicating the importance level of a call to the recipient mobile device via the IAM for the particular call, in accordance with the teachings of the present disclosure.

FIG. 4 illustrates a method 400 of communicating the importance level of a call to the recipient mobile device via the IAM for the particular call. At step 410, a mobile switching center may receive information related to a call placed by a mobile device. This information may include, for example, the identity of the originating mobile device (e.g., the mobile device from which the call is placed), the identity of the recipient mobile device, and an importance level designation. At step 420, the mobile switching center may generate an initial address message (IAM), including a notification value field in the mandatory variable part of the IAM. As discussed above, when a user places a call on a mobile device, the mobile switching center corresponding to the mobile device may generate an IAM, which may be transmitted from the mobile switching center through each base station and/or switch needed to complete the path between the mobile device placing the call and the mobile device receiving the call. An IAM may be transmitted in one of two formats—the format prescribed by ANSI or the format prescribed by ITU. An IAM may include a mandatory fixed part, a mandatory variable part, and an optional part. The IAM may include, among other information, the phone number of the originating mobile device, the name of the user of the originating mobile device, and information related to the importance level of the call, all of which may be displayed by the recipient mobile device when the call is received.

At step 430, the mobile switching center may determine, based on the received call information, whether the user of the originating mobile device designated an importance level for the call. As discussed above, a user placing a call on a mobile device may designate the importance level of a call by entering a particular sequence using the keypad of the mobile device. For example, in some embodiments, a user placing a call may designate the call as important by entering #1 following entry of the phone number of the recipient mobile device. In other embodiments, a call may be designated with varying levels of importance. For example, a user may designate the importance level of a call on a scale of 1-3, by entering #1, #2, or #3 following entry of the phone number of the mobile device to which the call is directed.

If the user has designated an importance level for the call, the method may proceed to step 440. At step 440, a notification value field of the IAM may be set to a value corresponding to the importance level designated by the user. For example, in some embodiments, a user placing a call may designate the call as important by entering #1 following entry of the phone number of the recipient mobile device, in which case, the notification value field of the IAM may be set to "1." As another example, in some embodiments, the user may designate the call as having an importance level of "2" by entering #2 following entry of the phone number of the recipient mobile device, in which case, the notification value field may be set to "2."

Once the notification value field has been set, the method may proceed to step 460. At step 460, the IAM may be transmitted to the recipient mobile device. As discussed above, an IAM transmitted from the mobile switching center corresponding to the originating mobile device through each base station and/or switch needed to complete the path between the originating mobile device and the recipient mobile device. When the IAM is received by the recipient mobile device, a notification corresponding to the value of the notification value field may be displayed on the screen of the recipient mobile device. The notification may be merely a display of the notification value or it may be a message corresponding to the importance level designated by the user. For example, in some embodiments, an importance level of "1" may correspond to a notification of "Urgent," an importance level of "2" may correspond to a notification of "Moderately Important," and an importance level of "3" may correspond to a notification of "Routine."

If the user has not designated an importance level for the call, the method may proceed to step 450. At step 450, the notification value field of the IAM may be set to "0," which indicates that an importance level has not been designated for the call. Once the notification value field has been set, the method may proceed to step 460. At step 460, the IAM may be transmitted to the recipient mobile device. If the notification value field is set to "0," no notification may be displayed on the screen of the recipient mobile device when the IAM is received.

Although the present disclosure has been described in detail, it should be understood that various changes, substitutions, and alterations can be made hereto without departing from the spirit and the scope of the disclosure as defined by the appended claims.

What is claimed is:

1. A method of communicating an importance level of a call to a recipient mobile device, the method comprising:
   receiving call information for a particular call at a mobile switching center;
   generating an initial address message for the particular call, the initial address message including a notification value field;
   determining whether an importance level has been designated for the particular call by a user of an originating mobile device;
   setting a value of the notification value field to a value corresponding to the importance level of the particular call if the importance level has been designated for the particular call; and
   transmitting the initial address message for the particular call to a recipient mobile device.

2. The method of claim 1, further comprising setting the value of the notification value field to zero, if the importance level of the particular call has not been designated.

3. The method of claim 2, wherein setting the value of the notification value field to a value corresponding to the importance level designation of the particular call comprises:
   determining the particular key sequence entered by a user of an originating mobile device;
   determining the importance level of the particular call based on the particular key sequence entered by the user of the originating mobile device; and
   setting the value of the notification value field to a value corresponding to the importance level.

4. The method of claim 1, wherein transmitting the initial address message for the particular call to the recipient mobile device comprises:
   transmitting the initial address message from the mobile switching center to the recipient mobile device via a destination mobile switching center.

5. The method of claim 1, wherein the initial address message is in the format prescribed by the American National Standards Institute (ANSI).

6. The method of claim 1, wherein the initial address message is in the format prescribed by the International Telecommunications Union (ITU).

7. A system for transmitting signals in a wireless communications network, the system comprising:
   a destination mobile switching center, the destination mobile switching center configured to communicate with a recipient mobile device;
   an originating mobile switching center, the originating mobile switching center configured to:
      receive call information for a particular call from an originating mobile device;
      generate an initial address message for the particular call, the initial address message including a notification value field;
      determine whether an importance level has been designated for the particular call by a user of an originating mobile device;
      set a value of the notification value field to a value corresponding to the importance level of the particular call if the importance level has been designated for the particular call; and
      transmit the initial address message for the particular call to a recipient mobile device via the destination mobile switching center.

8. The system of claim 7, further comprising setting the value of the notification value field to zero, if the importance level of the particular call has not been designated.

9. The system of claim 8, wherein setting the value of the notification value field to a value corresponding to the importance level designation of the particular call comprises:
   determining the particular key sequence entered by a user of an originating mobile device;
   determining the importance level of the particular call based on the particular key sequence entered by the user of the originating mobile device; and
   setting the value of the notification value field to a value corresponding to the importance level.

10. The system of claim 7, wherein the initial address message is in the format prescribed by the American National Standards Institute (ANSI).

11. The system of claim 7, wherein the initial address message is in the format prescribed by the International Telecommunications Union (ITU).

12. A mobile switching center of a wireless communications network, the mobile switching center comprising:
   a processor;
   a non-transitory, computer-readable medium storing computer-program instructions that, when executed, cause the processor to:
      receive call information for a particular call at a mobile switching center from an originating mobile device;
      generate an initial address message for the particular call, the initial address message including a notification value field;
      determine whether an importance level has been designated for the particular call by a user of the originating mobile device;
      set a value of the notification value field to a value corresponding to the importance level of the particular call if the importance level has been designated for the particular call; and
      transmit the initial address message for the particular call to a recipient mobile device.

13. The mobile switching center of claim 12, further comprising computer-program instructions stored on the non-transitory, computer-readable medium that, when executed, cause the processor to set the value of the notification value field to zero, if the importance level of the particular call has not been designated.

14. The mobile switching center of claim 13, wherein setting the value of the notification value field to a value corresponding to the importance level designation of the particular call comprises:
- determining the particular key sequence entered by a user of an originating mobile device;
- determining the importance level of the particular call based on the particular key sequence entered by the user of the originating mobile device; and
- setting the value of the notification value field to a value corresponding to the importance level.

15. The mobile switching center of claim 12, wherein transmitting the initial address message for the particular call to the recipient mobile device comprises:
- transmitting the initial address message from the mobile switching center to the recipient mobile device via a destination mobile switching center.

16. The mobile switching center of claim 12, wherein the initial address message is in the format prescribed by the American National Standards Institute (ANSI).

17. The mobile switching center of claim 12, wherein the initial address message is in the format prescribed by the International Telecommunications Union (ITU).

* * * * *